US012626068B2

(12) United States Patent
Vangala et al.

(10) Patent No.: US 12,626,068 B2
(45) Date of Patent: May 12, 2026

(54) LARGE LANGUAGE MODEL OUTPUT GENERATION USING DATA GRAPHS

(71) Applicant: Microsoft Technology Licensing, LLC, Redmond, WA (US)

(72) Inventors: Vipindeep Vangala, Hyderabad (IN); Rajeev Gupta, Hyderabad (IN); Madhusudhanan Krishnamoorthy, Srivilliputtur (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 228 days.

(21) Appl. No.: 18/210,511

(22) Filed: Jun. 15, 2023

(65) Prior Publication Data

US 2024/0419918 A1    Dec. 19, 2024

(51) Int. Cl.
*G06F 40/40* (2020.01)
*G06F 16/901* (2019.01)
(Continued)

(52) U.S. Cl.
CPC .......... *G06F 40/40* (2020.01); *G06F 16/9024* (2019.01); *G06F 16/90332* (2019.01);
(Continued)

(58) Field of Classification Search
CPC ................ G06F 40/40; G06F 16/9024; G06F 16/90332; G06F 16/90335; G06F 40/284; G06F 16/3329; G06N 3/08
See application file for complete search history.

(56) References Cited

U.S. PATENT DOCUMENTS

2024/0333750 A1* 10/2024 Parla ...................... G06F 21/563
2024/0411797 A1* 12/2024 Blum .................... G06F 16/355
(Continued)

FOREIGN PATENT DOCUMENTS

WO     2021108679 A1   6/2021

OTHER PUBLICATIONS

Zhang et al, KnowGPT: Black-Box knowledge Injection for Large Language Models, https://arxiv.org/abs/2312.06185v1, Dec. 11, 2023, pp. 1-14 (Year: 2023).*
(Continued)

*Primary Examiner* — Linda Wong
(74) *Attorney, Agent, or Firm* — Shook, Hardy & Bacon L.L.P.

(57) ABSTRACT

Systems and methods for generating output data based on a data graph are provided. An output request for the output data based on the data graph is received. The output request comprises one of a natural language request from a target user or an application request from an application of the target user. The data graph has nodes and edges between the nodes. The nodes represent entities associated with an enterprise organization and the edges represent relationships among the entities. A graph data query is generated with a large language model (LLM) using the output request as a first input to the LLM. The graph data query is performed against the data graph to obtain a graph data output that represents a sub-portion of the data graph. The output data is generated with the LLM using the graph data output as a second input to the LLM.

20 Claims, 9 Drawing Sheets

(51) Int. Cl.
  *G06F 16/903*      (2019.01)
  *G06F 16/9032*     (2019.01)
  *G06F 40/284*      (2020.01)
  *G06N 3/08*        (2023.01)

(52) U.S. Cl.
  CPC ...... *G06F 16/90335* (2019.01); *G06F 40/284*
                (2020.01); *G06N 3/08* (2013.01)

(56)                References Cited

U.S. PATENT DOCUMENTS

2025/0112878 A1 *  4/2025  Bayless ................... H04L 51/02
2025/0342365 A1 *  11/2025  Rama ....................... G06N 5/02

OTHER PUBLICATIONS

Liang et al, Prompting Large Language Models with Chain of Though for Few-shot knowledge base question generation, https://arxiv.org/abs/2310.08395, Oct. 23, 2023 (Year: 2023).*

Yasunaga et al, QA-GNN: Reasoning with Language Models and Knowledge Graphs for Question Answering, https://arxiv.org/abs/2104.06378, Dec. 13, 2022 (Year: 2022).*

Feng et al, Scalable Multi-Hop Relational Reasoning for Knowledge-Aware Question Answering, https://aclanthology.org/2020.emnlp-main.99/, Proceedings of the 202 Conference on Empirical Methods in Natural Language Processing, Nov. 2020, pp. 1295-1309 (Year: 2020).*

International Search Report and Written Opinion received for PCT Application No. PCT/US2024/033182, Sep. 10, 2024, 14 pages.

International Preliminary Report on Patentability (Chapter I) received for PCT Application No. PCT/US2024/033182, mailed on Dec. 26, 2025, 09 Pages.

* cited by examiner

600

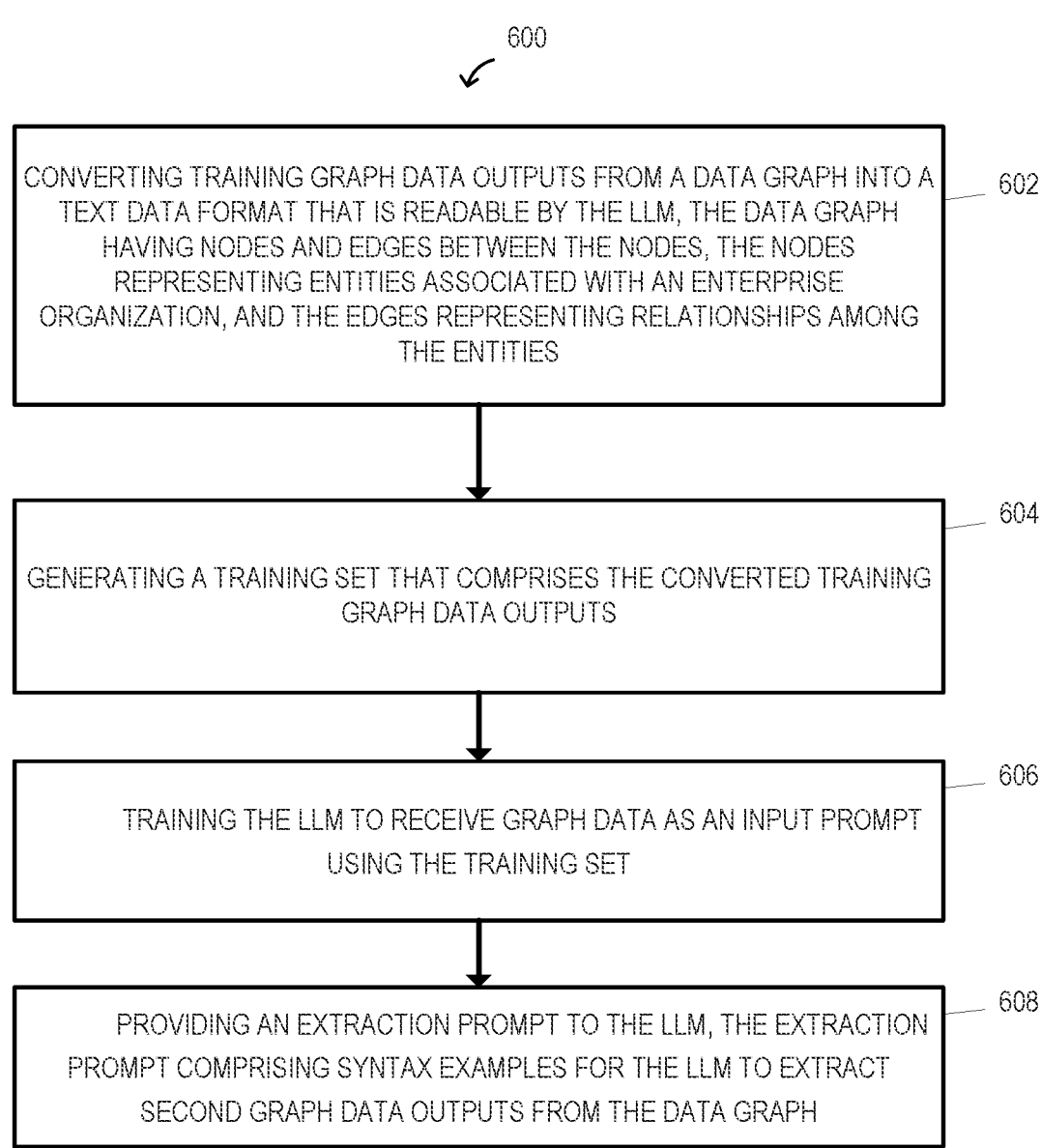

CONVERTING TRAINING GRAPH DATA OUTPUTS FROM A DATA GRAPH INTO A TEXT DATA FORMAT THAT IS READABLE BY THE LLM, THE DATA GRAPH HAVING NODES AND EDGES BETWEEN THE NODES, THE NODES REPRESENTING ENTITIES ASSOCIATED WITH AN ENTERPRISE ORGANIZATION, AND THE EDGES REPRESENTING RELATIONSHIPS AMONG THE ENTITIES — 602

GENERATING A TRAINING SET THAT COMPRISES THE CONVERTED TRAINING GRAPH DATA OUTPUTS — 604

TRAINING THE LLM TO RECEIVE GRAPH DATA AS AN INPUT PROMPT USING THE TRAINING SET — 606

PROVIDING AN EXTRACTION PROMPT TO THE LLM, THE EXTRACTION PROMPT COMPRISING SYNTAX EXAMPLES FOR THE LLM TO EXTRACT SECOND GRAPH DATA OUTPUTS FROM THE DATA GRAPH — 608

Fig. 6

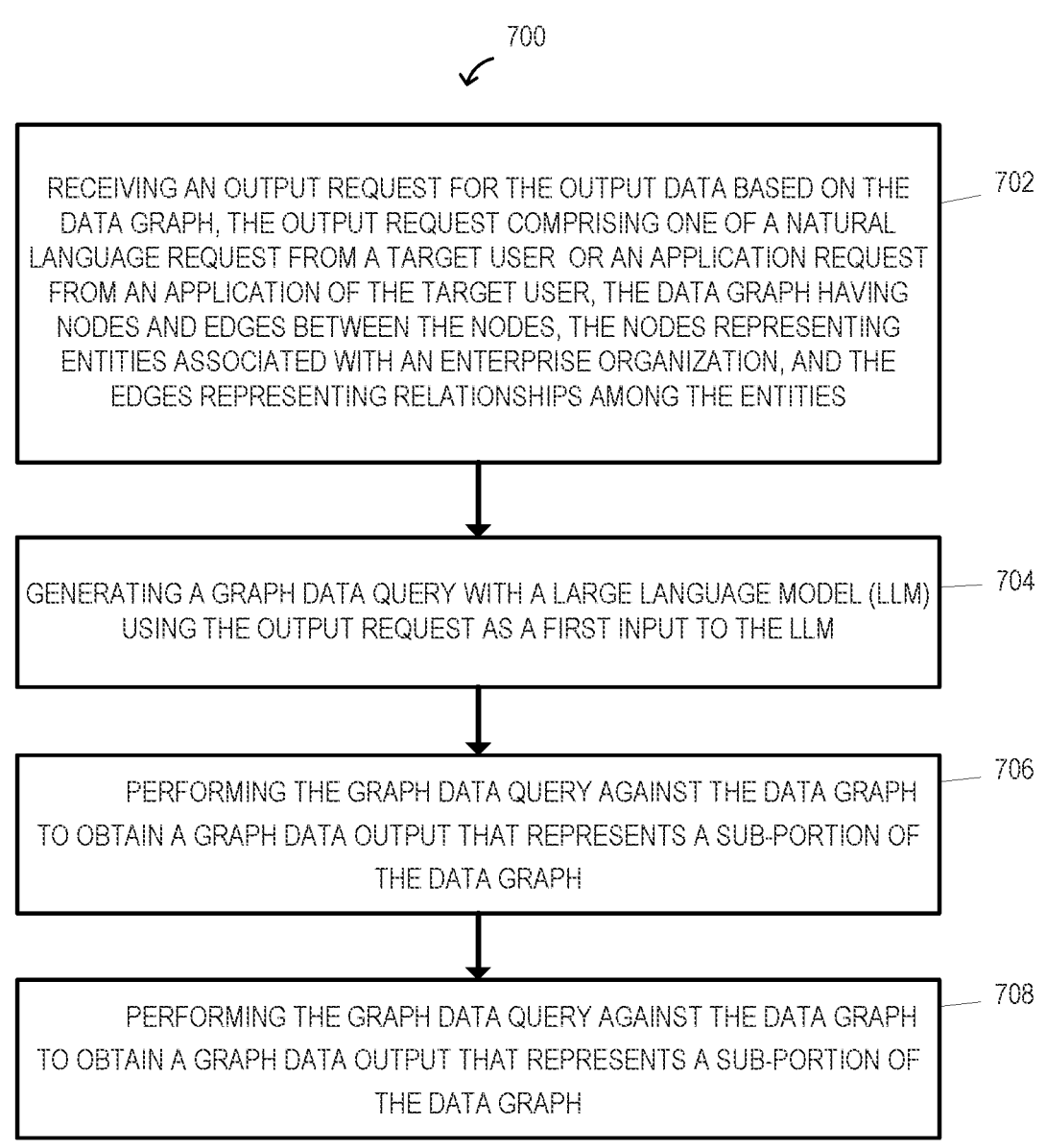

700

RECEIVING AN OUTPUT REQUEST FOR THE OUTPUT DATA BASED ON THE DATA GRAPH, THE OUTPUT REQUEST COMPRISING ONE OF A NATURAL LANGUAGE REQUEST FROM A TARGET USER OR AN APPLICATION REQUEST FROM AN APPLICATION OF THE TARGET USER, THE DATA GRAPH HAVING NODES AND EDGES BETWEEN THE NODES, THE NODES REPRESENTING ENTITIES ASSOCIATED WITH AN ENTERPRISE ORGANIZATION, AND THE EDGES REPRESENTING RELATIONSHIPS AMONG THE ENTITIES — 702

GENERATING A GRAPH DATA QUERY WITH A LARGE LANGUAGE MODEL (LLM) USING THE OUTPUT REQUEST AS A FIRST INPUT TO THE LLM — 704

PERFORMING THE GRAPH DATA QUERY AGAINST THE DATA GRAPH TO OBTAIN A GRAPH DATA OUTPUT THAT REPRESENTS A SUB-PORTION OF THE DATA GRAPH — 706

PERFORMING THE GRAPH DATA QUERY AGAINST THE DATA GRAPH TO OBTAIN A GRAPH DATA OUTPUT THAT REPRESENTS A SUB-PORTION OF THE DATA GRAPH — 708

Fig. 7

LARGE LANGUAGE MODEL OUTPUT GENERATION USING DATA GRAPHS

BACKGROUND

Enterprise organizations such as businesses with hundreds or thousands of employees may manage large amounts of data for entities associated with the organization, such as various users (e.g., employees), emails sent by the users, documents generated by the users, meetings attended by the users, etc. These entities may have relationships among themselves, for example, a first user (e.g., a first entity) may have an authorship relationship with a document (e.g., a second entity) that the first user generated. Further relationships may be created or modified when the document is shared with a second user of the organization, included in an email message, or referenced within a meeting invite. Knowledge of these relationships may be leveraged to recommend relevant entities to a user when performing some tasks, such as sending an email (e.g., recommendations for documents to be attached) or composing a meeting invite (e.g., recommendations for users to invite). Data for the entities and relationships may be stored as a data graph having nodes representing the entities and edges between nodes representing the relationships. However, creating a suitable query that extracts relevant information from the data graph may be challenging or time consuming for some users. Moreover, the result of a query (e.g., several documents and emails) may be too cumbersome or complex for a user to review when limited time is available, such as during preparations for a meeting that is about to begin.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to using a data graph as an input to a neural network model, such as a large language model (LLM).

In accordance with at least one example of the present disclosure, a computer-implemented method of generating output data based on a data graph is provided. The method includes: receiving an output request for the output data based on the data graph, the output request comprising one of a natural language request from a target user or an application request from an application of the target user, the data graph having nodes and edges between the nodes, the nodes representing entities associated with an enterprise organization, and the edges representing relationships among the entities; generating a graph data query with a large language model (LLM) using the output request as a first input to the LLM; performing the graph data query against the data graph to obtain a graph data output that represents a sub-portion of the data graph; and generating the output data with the LLM using the graph data output as a second input to the LLM.

In accordance with at least one example of the present disclosure, a computer-implemented method for training a large language model (LLM) is provided. The method comprises: converting training graph data outputs from a data graph into a text data format that is readable by the LLM, the data graph having nodes and edges between the nodes, the nodes representing entities associated with an enterprise organization, and the edges representing relationships among the entities; generating a training set that comprises the converted training graph data outputs; training the LLM to receive graph data as an input prompt using the training set; and providing an extraction prompt to the LLM, the extraction prompt comprising syntax examples for the LLM to extract second graph data outputs from the data graph.

In accordance with at least one example of the present disclosure, a system for generating output data based on a data graph is provided. The system includes at least one processor, and at least one memory storing computer-executable instructions that when executed by the at least one processor cause the at least one processor to: receive an output request for the output data based on the data graph, the output request comprising one of a natural language request from a target user or an application request from an application of the target user, the data graph having nodes and edges between the nodes according to a graph schema, the nodes representing entities associated with an enterprise organization, and the edges representing relationships among the entities; generate a graph data query with a large language model (LLM) using the output request as a first input to the LLM, the graph data query being based on the graph schema; perform the graph data query against the data graph to obtain a graph data output that represents a sub-portion of the data graph; generate the output data with the LLM using the graph data output as a second input to the LLM.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

FIG. 6 shows a diagram of an example method for training a LLM, according to an example embodiment.

FIG. 7 shows a diagram of an example method for generating output data based on a data graph, according to an example embodiment.

DETAILED DESCRIPTION

Figure 1:
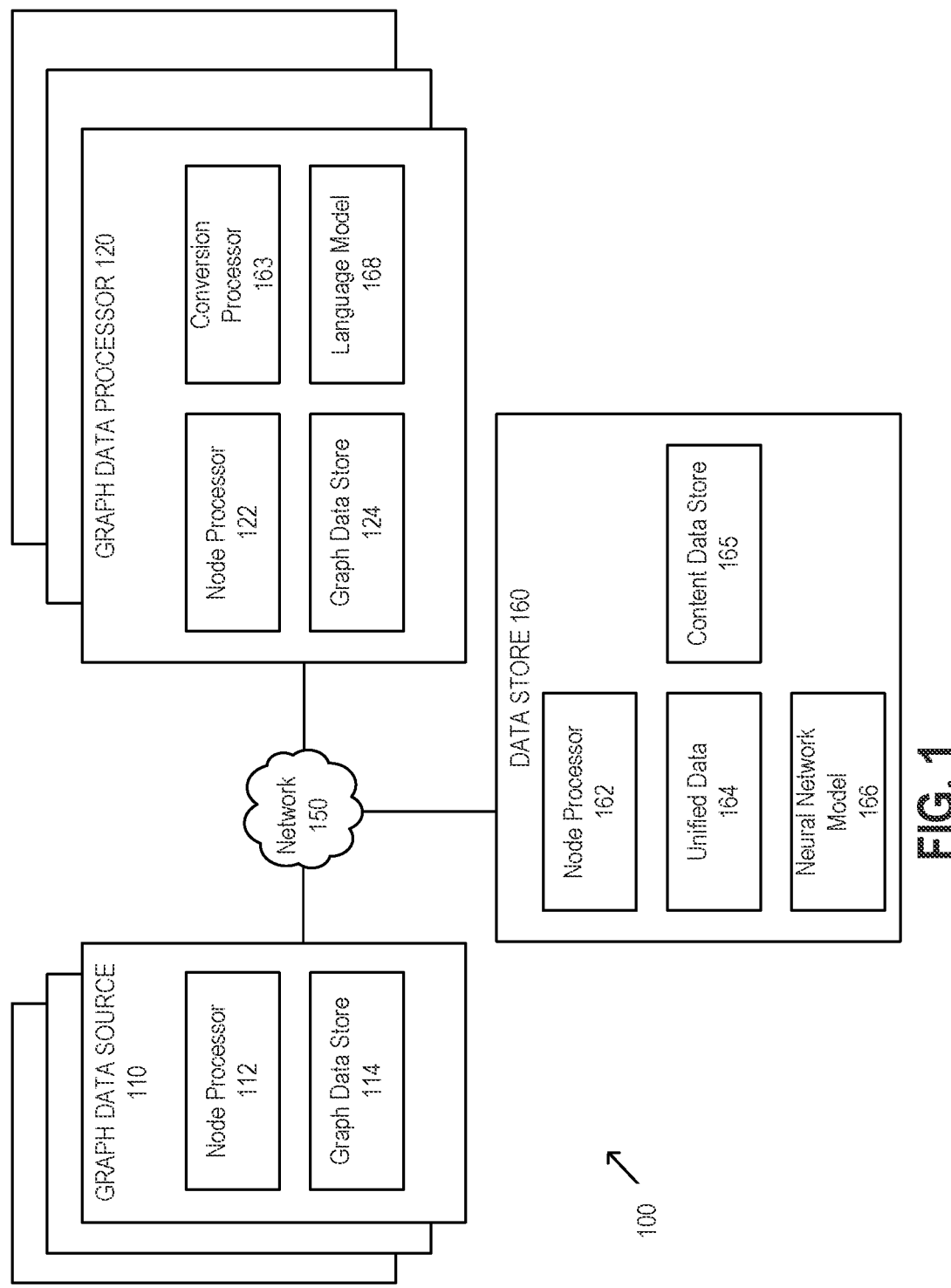
FIG. 1 shows a block diagram of an example of a data graph processing system for a large language model (LLM), according to an example embodiment.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Data graphs may be generated where nodes represent entities associated with an enterprise organization and edges between the nodes represent relationships among the entities. The nodes may represent entities such as users, documents, emails, meetings, and conversations, while the edges represent relationships, such as document authorship, document modification, document sharing, meeting invites, linked data between documents, email sending, email replying, etc. Data graphs often contain information that improves searches, predictions, recommendations, entity-entity lookups, clustering, and other processing scenarios, but efficient searching and consumption of data from a data graph encompassing an entire organization is challenging. In some cases, an enterprise level data graph may have millions of nodes and billions of relationships.

To obtain useful information from the data graph, a query for extracting a result from the data graph may be written by a user. Generally, the query takes a suitable form according to a structure of the data graph, for example, by referencing specific types or names of nodes and edges, which may be similar to creating a query using structured query language (SQL). However, this approach increases the difficulty with which a user may interact with the graph data because the user may not know which nodes or node types are available, what relationships are represented by the data graph, etc. Even after a suitable query has been generated and executed to provide a result from the data graph, the result may include many documents, contacts, etc. that cannot be readily consumed (e.g., reviewed and understood) when limited time is available.

In examples described herein, a data graph is used to provide an input to a neural network model, such as a large language model (LLM). A data graph input may be a data structure that represents a portion of the data graph or data that is generated based on a query result from the data graph, in various examples. The data graph inputs may be in the form of a prompt to the neural network model, a training set for the neural network model, or a combination thereof. By training the LLM with the data graph inputs, the LLM may be configured to access information from the data graph, for example, to identify relevant documents for a user, extract portions of the data graph for further processing, etc. Moreover, the LLM may be configured to process data based on prioritizations represented within the data graph. For example, the LLM may generate different summaries of a document or email for particular users that place more emphasis on technical features when that user is a software developer, or more emphasis on financial details when that user is a project manager. Advantageously, the prioritization may be based on data within the data graph, without explicit requests by the user for their own prioritization.

In some examples, a natural language request is received from a target user for output data based on a data graph. The data graph has nodes and edges between the nodes according to a graph schema. The nodes represent entities associated with an enterprise organization and the edges represent relationships among the entities. As one example, the target user may request a meeting preparation summary for their next meeting, where relevant documents and emails for the meeting, along with an entity for the meeting itself, are represented in the data graph. A graph data query is generated with a large language model (LLM) using the natural language request as a first input to the LLM. The graph data query is based on the graph schema so that the graph data query may be performed against the data graph, resulting in a graph data output that represents a sub-portion of the data graph. The sub-portion of the data graph may include a node for an agenda of the meeting, nodes for users expected to attend the meeting, a node for recent documents discussed at a previous meeting, or other suitable node. The output data is generated with the LLM using the graph data output as a second input to the LLM. For example, the LLM may generate a summary of the agenda and recent documents using information from the sub-portion of the data graph.

In accordance with embodiments of the present disclosure, FIG. 1 depicts an example of a data graph processing system 100 for a large language model. The data graph processing system 100 is configured to use a neural network model to improve processing of graph data, for example, extraction of graph data from a data graph and processing of the graph data to provide useful information to a user. To do so, the data graph processing system 100 includes one or more of a graph data source 110, a graph data processor 120, and a data store 160. A network 150 communicatively couples the graph data source 110, the graph data processor 120, and the data store 160. The network 150 may comprise one or more networks such as local area networks (LANs), wide area networks (WANs), enterprise networks, the Internet, etc., and may include one or more of wired, wireless, and/or optical portions.

The graph data source 110 may be any suitable type of computing device, including a desktop computer or PC (personal computer), server, distributed computing platform, or cloud platform device. The graph data source 110 may be configured to execute one or more software applications (or "applications") and/or services and/or manage hardware resources (e.g., processors, memory, etc.), which may be utilized by users of the graph data source 110 and/or the graph data processor 120. The graph data processor 120 may be similar to the graph data source 110, or may include one or more server devices, distributed computing platforms, cloud platform devices, and/or other computing devices. In some examples, both the graph data source 110 and graph data processor 120 may be mobile computing devices, stationary computing devices, server devices, distributed computing platforms, and/or cloud platform devices. For ease of discussion, the description herein refers to a single graph data source 110, but features and examples of the graph data source 110 are applicable to two, three, or more instances of the graph data source 110. Similarly, the description herein refers to a single graph data processor 120, but features and examples of the graph data processor 120 are applicable to two, three, or more instances of the graph data processor 120.

The graph data source 110 is configured to provide graph data for graphs that represent entities (e.g., of an enterprise organization or business organization) and corresponding relationships among the entities. As such, the graph data source 110 may be referred to herein as a source computing device or data source. Various examples of entities are contacts (e.g., users), emails, meetings, documents, topics, messages, conversations, channels or news feeds, acronyms, definitions, key phrases, or other suitable entities. Examples of relationships are document authorship, document modification, document sharing, meeting invites, linked data between documents, email sending, email replying, or other suitable relationships. The graph data source 110 are further configured to manage, modify, and/or store the graph data.

The graph data source 110 comprises a node processor 112 and a graph data store 114. The node processor 112 is configured to generate and/or process graph data, and the graph data store 114 is configured to store the graph data. In some examples, the graph data processor 120 comprises a node processor 122 and a graph data store 124, which are generally similar to the node processor 112 and the graph data store 114, respectively. The graph data processor 120 further comprises a conversion processor 163 and a language model 168.

Generally, the language model 168 is a neural network model configured for generating a text output based on a text input, the output is generally in a natural language format, for example, written in a conversational way that is readily understood by users even without special training on computers. The conversion processor 163 is configured to convert a graph data output from a data graph into a text data format that is readable by the LLM 168. Although the conversion processor 163 and the LLM 168 are shown as part of the graph data processor 120, one or both of the conversion processor 163 and the LLM 168 may be implemented on the graph data source 110, the data store 160, a standalone computing device (not shown), a distributed computing device (e.g., cloud service), or other suitable processor.

The node processors 112 and 122 may be implemented as software modules, application specific integrated circuits (ASICs), firmware modules, or other suitable implementations, in various embodiments. The graph data stores 114 and 124 may be implemented as one or more of any type of storage mechanism, including a magnetic disc (e.g., in a hard disk drive), an optical disc (e.g., in an optical disk drive), a magnetic tape (e.g., in a tape drive), a memory device such as a random access memory (RAM) device, a read-only memory (ROM) device, etc., and/or any other suitable type of storage medium.

In some examples, the graph data source 110 and/or graph data processor 120 correspond to a user application or user service for the enterprise organization, where the user application facilitates the use and/or storage of data for, or about, entities of the enterprise organization. Example user applications include email applications (e.g., Microsoft Outlook), messaging applications (e.g., Microsoft Teams), social networks or professional networks (e.g., LinkedIn), search applications (e.g., Bing), document repository applications (e.g., Microsoft SharePoint), or other suitable applications and services. The user applications may be referred to as graph data generators in that they generate data about entities (e.g., documents, emails, contacts) and relationships among those entities.

In some examples, the graph data source 110 and graph data processor 120 generate graph data independently from each other, which may then be combined into a universal graph, for example. In other words, the graph data source 110 may provide an Outlook email service and generate graph data related to emails and contacts, while the graph data processor 120 may provide a SharePoint document service and generate graph data related to documents, with one or both of the graph data source 110 and graph data processor 120 generating the graph data independent from the other computing device. Different user applications may have access to additional information about an entity, so improved knowledge about an entity is obtained when graph data from different user applications (or different access levels) is combined. For example, a text document may be authored and sent by a first user to a second user in an email using an Outlook email application, while the text document may also be shared with a third user by the second user in a Teams messaging application. By combining graph data from both the email application and the messaging application, knowledge of a relationship between the text document and the third user (e.g., a Viewed relationship) is made available to the Outlook email application and knowledge of a relationship between the text document and the first user (e.g., an Author relationship) is made available to the messaging application. This knowledge provided to both applications allows for more accurate recommendations and predictions, in various scenarios, such as when recommending files to attach to an email or recipients of an email. Moreover, an additional relationship between the first user and the third user may be identified, and a corresponding new edge may be generated for the data graph. This new edge may be populated or pushed into the graph data of the Outlook email application and/or the graph data of the messaging application. As one example, the graph data source 110 may correspond to an email application and the graph data processor 120 may correspond to a Teams messaging application.

The node processor 112 is configured to generate graph data (e.g., data graph 200, FIG. 2) for the corresponding user application (e.g., Outlook) and store the graph data in the graph data store 114. Similarly, the node processor 122 is configured to generate graph data for a corresponding user application (e.g., Teams) and store the graph data in the graph data store 124. As will be understood by those skilled in the art, the graph data stores 114 and 124 store the graph data about the entities (e.g., documents, messages, etc.), while the entities themselves may be stored in the graph data stores, separate data stores such as content data store 165, or other suitable locations.

The data store 160 is configured to combine graph data generated by one or more of the graph data source 110 and/or graph data processor 120 to generate a unified data graph. In various embodiments, the data store 160 is a network server, cloud server, network attached storage ("NAS") device, or other suitable computing device. The data store 160 may include one or more of any type of storage mechanism, including a magnetic disc (e.g., in a hard disk drive), an optical disc (e.g., in an optical disk drive), a magnetic tape (e.g., in a tape drive), a memory device such as a random access memory (RAM) device, a read-only memory (ROM) device, etc., and/or any other suitable type of storage medium. Although only one instance of the data store 160 is shown in FIG. 1, the data graph processing system 100 may include two, three, or more similar instances of the data store 160. Moreover, the network 150 may provide access to other data stores, similar to data store 160 that are located outside of the data graph processing system 100, in some embodiments.

The data store 160 includes a node processor 162, unified data 164, a content data store 165, and a neural network model 166. The node processor 162 is configured to combine graph data from different graph data sources 110 or graph data processors 120 into a data graph, such as data graph 164 (also referred to as the unified data 164). The node processor 162 may be configured to utilize a neural network model (or machine learning model), such as the neural network model 166, to generate embeddings for unified data 164 or other suitable analysis. In some examples, the node processor 162 may be similar to the node processors 112 and 122. For example, the node processor 162 may both generate graph data and combine graph data from other sources (e.g., graph data source 110). In some examples, the node processor 162 may be implemented as a standalone computing device or server, similar to the graph data source 110 or graph data processor 120.

The unified data 164 include combined graph data from graph data stores 114 and 124, for example, as a centralized repository of graph data. For example, the unified data 164 may be a representation of entities associated with an organization along with relationships among the entities. In some examples, the unified data 164 generally corresponds to the data graph 200 (FIG. 2) and may be stored as one or more data structures, database entries, or other suitable format. In other examples, the unified data 164 may be omitted and graph data may be obtained dynamically from local graph data stores (e.g., graph data stores 114 and 124). The content data store 165 includes documents, files, profiles for users, and/or signals that represent user interactions between the entities. Although a single content data store 165 is shown, the content data store 165 may be implemented in a distributed manner across several instances of the data store 160. For example, a first data store may host an Exchange server for email and user accounts, a second data store may host a SharePoint server for files and documents, a third data store may host a SQL database, etc.

In accordance with examples of the present disclosure, the node processors 112, 122, or 162 are further configured to extract graph data from the unified data 164. To do so, the node processors 112, 122, 162 may receive a request for graph data based on the unified data 164 (or local graph data stores 114, 124). In various examples, the request may be one of many different types, for example, a request for candidate generation (e.g., files to be attached to an email), a request for relevant entities for a search (e.g., files related to a topic), a request for automatic suggestions or recommendations of entities (e.g., users to be included on an email or meeting request), a request for synthesis of entities, or other suitable request types. The graph data provided in response to a request may include nodes of the data graph 200, edges of the data graph 200, embeddings, documents or files corresponding to the nodes or edges, or identifiers (e.g., unique identifiers, links, file locations, etc.) that correspond to the nodes and/or edges. In other words, the request may be referred to as a request for embeddings, nodes, edges, documents, files, users, and/or meetings that are related to a search query.

As described above, the language model 168 is a neural network model, such as a large language model (LLM), and may be configured to process a prompt and provide an output. The LLM 168 may be implemented as a transformer model (e.g., Generative Pretrained Transformer), for example, or other suitable model. Generally, the LLM 168 may receive a prompt from a user, application programming interface (API), an application executed by a computing device (e.g., graph data source 110 or graph data processor 120) other suitable input source.

Generally, the LLM 168 is configured to process prompts that have been written in natural language or suitable text data format, but may also process prompts containing programming language code, scripting language code, text (formatted or plain text), pseudo-code, XML, HTML, JSON, images, videos, etc. In some scenarios, the text data format is compatible with an API for a software module or processor from which the LLM 168 may receive input data, and/or with a software module or processor to which the LLM 168 may provide output data.

In some examples, the LLM 168 communicates with another neural network model (not shown), executable (not shown), or API (not shown) that converts all or a portion of a received prompt or other input into a suitable format for processing by the LLM 168. For example, the LLM 168 may receive a prompt containing an image and a natural language question pertaining to the image. The LLM 168 may provide the image to a neural network model that converts the image into a textual description of the content of the image, where the LLM 168 then processes the textual description (either as an augmented prompt containing the textual description and natural language question, or as a follow-up prompt containing the textural description).

In some examples, an input prompt for the LLM 168 is provided from a target user at a user interface (e.g., user interface 410, FIG. 4) and may comprise a request for information related to nodes of the data graph 200. Generally, the LLM 168 may process the input prompt and generate a suitable graph data query, which may then be performed against the data graph 200 (e.g., by a node processor) to obtain a graph data output. Examples of an input prompt comprise: "What are the planning documents that have been worked on by Nikhil and Rushi?" "I missed the name of one large language model document created by Chris. Could you please help me find it?" "Please help me prepare for my next meeting with Vipin". Advantageously, the LLM 168 generates the graph data query, instead of a user manually creating the graph data query.

In other examples, an extraction prompt for the LLM 168 comprises syntax examples for the LLM 168 to extract graph data outputs from the data graph 200. Using the extraction prompt as a reference, the LLM 168 is able to generate queries for the node processors to retrieve graph data or documents based on an input prompt. Generally, the extraction prompt describes a structure of the data graph (e.g., nodes, edges, metadata, fields, etc.) and semantics for how a request to a node processor should be formatted. The extraction prompt may be a single prompt, or a plurality of separate prompts that are provided to the LLM 168 (e.g., during a session startup, LLM initialization, after a reset, etc.). An example extraction prompt is:

---

I want you to extract the entities from the question provided and place them in the form provided in examples. Keys are sourceType, sourceEntity, Relation, targetType, targetEntity, values are lists. You should choose an appropriate Relation only from [" ", "contains", "had shared", "To recipient", "CC recipient", "Authored by"]. You should choose sourceType and targetType only from [" ", "Meeting", "Email", "Document", "Contact", "Topic"]
Examples:
    question: How many documents were authored by Vipindeep?
    completion: "[sourceType: Document; Relation: "Authored by"; targetEntity: Vipindeep; targetType: Contact]"
    question: How many emails contain the CalendarFeature.pptx attachment?
    completion: "[sourceType: Email; Relation:Contains; targetType:Document; targetEntity: "CalendarFeature.pptx"]"

---

In this example, the keys and relations define at least some of the structure of the data graph 200. In other examples, the extraction prompt may include more complex queries having multiple targets, multiple sources, etc.

In still other examples, a prioritization prompt comprises syntax examples for the LLM 168 to extract weights for nodes of the data graph 200 based on edges of the nodes. The prioritization prompt may include examples on how to extract embeddings, metadata, or fields associated with nodes. In some examples, the prioritization prompt comprises examples calls to an API for the node processor 162 to rank or prioritize a group of nodes according to relevance to a user based on how recently a corresponding entity has been used or modified by the user (e.g., higher priority for more recent access), to whom an entity (e.g., document) was sent (e.g., higher priority for files sent to a manager than to an external contact), how many times an entity (e.g., user) was called, etc.

In some examples, the graph data stores 114 and/or 124 include data in alternative formats, such as a log file, telemetry file, entities, that is stored/used in accordance with privacy and compliance policies of enterprises. In some examples, the node processor 112 processes the data in alternative formats, such as a log file or telemetry file, and generates new graph data (e.g., nodes and/or edges) for storage in the graph data store 114.

Figure 2:
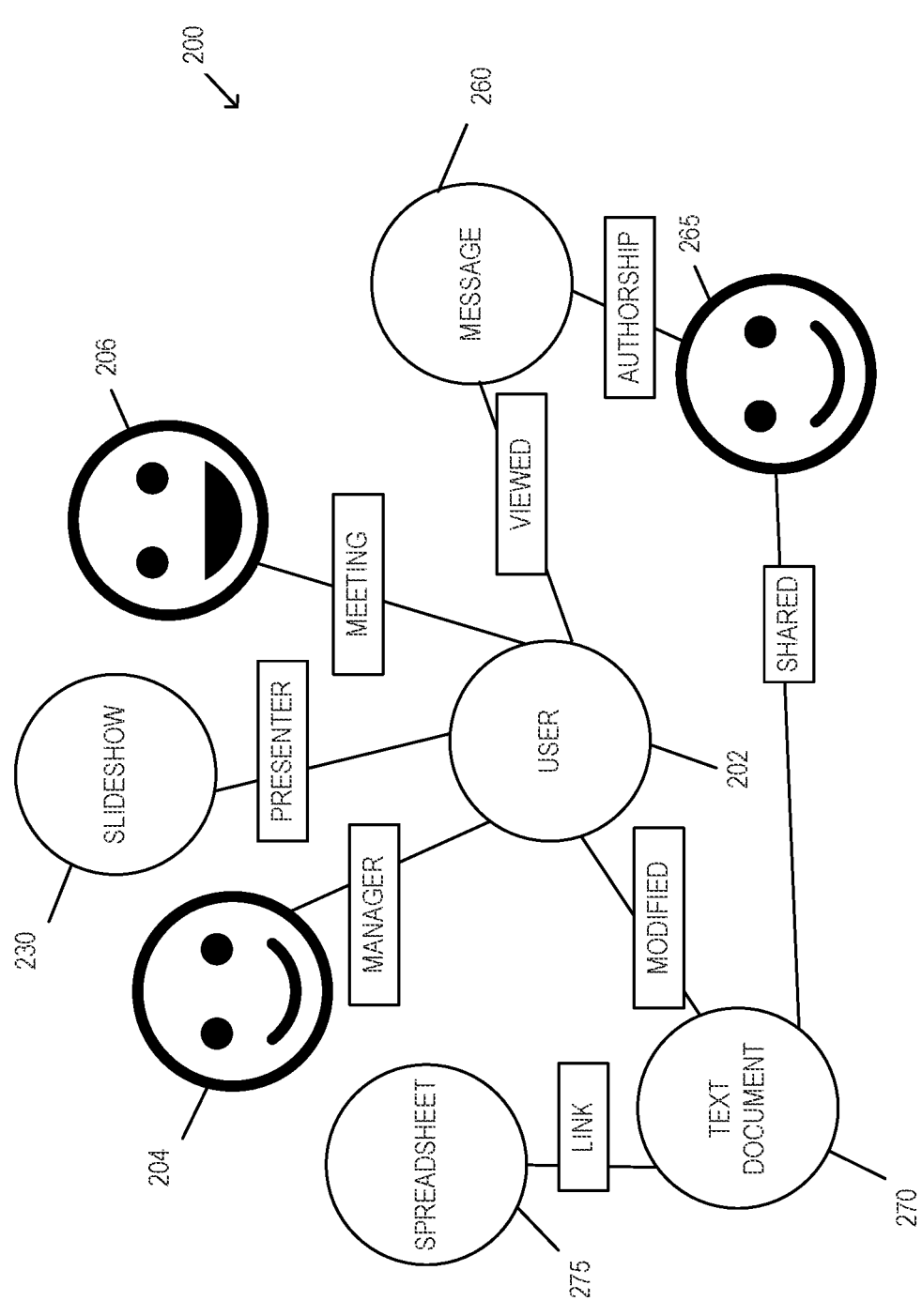
FIG. 2 shows a diagram of an example of a data graph, according to an example embodiment.

FIG. 2 depicts an example of a data graph 200, according to an embodiment. The data graph 200 generally corresponds to an enterprise organization, business, work group, or other suitable domain, in various examples. In some examples, the data graph 200 is provided as a combination of sub-graphs from the graph data source 110 (e.g., associated with an email application) and the graph data processor 120 (e.g., associated with a messaging application). In other examples, the data graph 200 is provided as a centralized graph (e.g., unified data 164).

The data graph 200 has nodes representing entities associated with the enterprise organization and edges between nodes representing relationships among the entities. In some examples, the data graph 200 is a data and interaction graph that contains information related to interactions with entities, for example, where the interactions are represented by the edges between nodes. Examples of the entities may include documents (e.g., spreadsheets, text documents, videos, images, etc.), files, users (e.g., employees, clients, vendors), emails, messages, meetings, organizational groups (e.g., accounting, research and development, etc.), topics, topic-based groups (e.g., users that have searched for or created documents associated with a topic), or other suitable entities. The relationships between entities may include document authorship or modification by a user (or group), document sharing by a user, meeting invites or attendance by a user, linked data between documents, comments and/or replies to comments, emails and email replies, or other suitable relationships. In some scenarios, multiple different relationships are present between two or more nodes. For example, a user may modify a slideshow (modification relationship), present the slideshow (presenter relationship), share the slideshow (sharing relationship), etc.

In the example shown in FIG. 2, the data graph 200 includes user nodes 202, 204, 206, and 265, a slideshow node 230, a text document node 270, a spreadsheet node 275, and a message node 260. For example, the user node 202 may represent a first employee of an enterprise organization, while the user node 204 may represents a second employee that is the first employee's manager. In other words, the user node 202 and the user node 204 share a manager relationship represented by an edge in the data graph 200. The slideshow node 230 may represent a PowerPoint presentation that the first employee has previously presented so that the user node 202 and the slideshow node

230 share a presenter relationship. The user node 206 may represent a third employee that attended a meeting with the first employee so that the user node 202 and the user node 206 share a meeting relationship.

The user node 265 may represent a fourth employee that has authored a message (message node 260), where the message was viewed by the first employee (user node 202). The fourth employee may also have shared the text document (text document node 270). Accordingly, the fourth employee (user node 265) has shared the text document (node 270) that was authored by the first employee (node 202). In some examples, the node processor 162 is configured to combine data graphs from different graph data stores (e.g., graph data stores 114, 124) into the data graph 200, combining the corresponding nodes and relationships and providing additional insights to the entities of the enterprise organization.

Some nodes within the data graph 200 may not be directly related to another, but are related through one, two, three, or more intermediate nodes. For example, the message node 260 shares a viewed relationship with the user node 202 (e.g., the first employee has viewed a comment or message represented by the message node 260) while the user node 265 represents a fourth employee who has authored the message (e.g., the fourth employee has an authorship relationship with the message node 260). As another example, the text document node 270) may represent a text document that contains a link to data within a spreadsheet represented by the spreadsheet node 275 (e.g., a link relationship between the text document node 270) and the spreadsheet node 275). Although only a small number of nodes are shown in FIG. 2 for clarity, it will be appreciated that an enterprise organization with hundreds or thousands of employees and their associated documents, meeting calendars, etc. may have millions of nodes with billions of edges for relationships among those nodes. Moreover, these nodes and relationships may originate within two, three, or more different data sources (e.g., the graph data source 110 and/or graph data processor 120).

In various examples, nodes of the data graph 200 include content, metadata, or both content and metadata. For example, content of the slideshow node 230 may include text, images, and animations that appear within the corresponding slideshow. Metadata may include a number of times that the slideshow has been presented, viewed, or modified, a file size or slide count, times when the slideshow was accessed, a duration of time since a most recent access, etc. Some nodes of the data graph 200 may contain metadata that is not present within other nodes.

In some examples, embeddings are generated for data graphs where the embeddings represent semantics of entities within an enterprise organization. The embeddings may be implemented in a relatively low dimension vector space or feature space, for example, as a vector having ten, twenty, one hundred elements, or another suitable number of elements to allow for more efficient processing as compared to graph walks. Moreover, in contrast to systems that use embeddings based only on the content (e.g., text) for an entity, examples described herein utilize a node processor that generates embeddings based on content, relationships, and/or both content and relationships among the entities.

In some examples, each node of the data graph 200 is associated with a set of embeddings at different granularity levels or "slices" of the data graph. As a first example, the set of embeddings may include a first embedding based on a user-level slice which represents all the entity interactions and knowledge at a user level. These user-level embeddings are per-user and represent deeper level of user personalization, but may not always have context of a broader perspective. As a second example, the set of embeddings may include a second embedding based on a group-level slice which represents group level entity relations (e.g., relationships among departments instead of individuals). As a third example, the set of embeddings may include a third embedding based on an enterprise-level slice (e.g., the data graph 200 in its entirety). Generally, the second embedding based on the group-level slice may be more scalable than the third embedding based on the enterprise-level slice. As described above, the node processor 112 may prune the data graph 200 to obtain an instance of the data graph 200 that is specific to a desired granularity level before generating a corresponding embedding for the desired granularity level.

Graph views or subsets of the data graph 200 may be generated, for example, by filtering the data graph 200 by entity type, relationship type, values of particular fields, data source (e.g., graph data source 110 or graph data processor 120), time range, or other suitable criteria and provided back to the graph data source 110 or graph data processor 120 for further analysis and deep learning.

Figure 3:
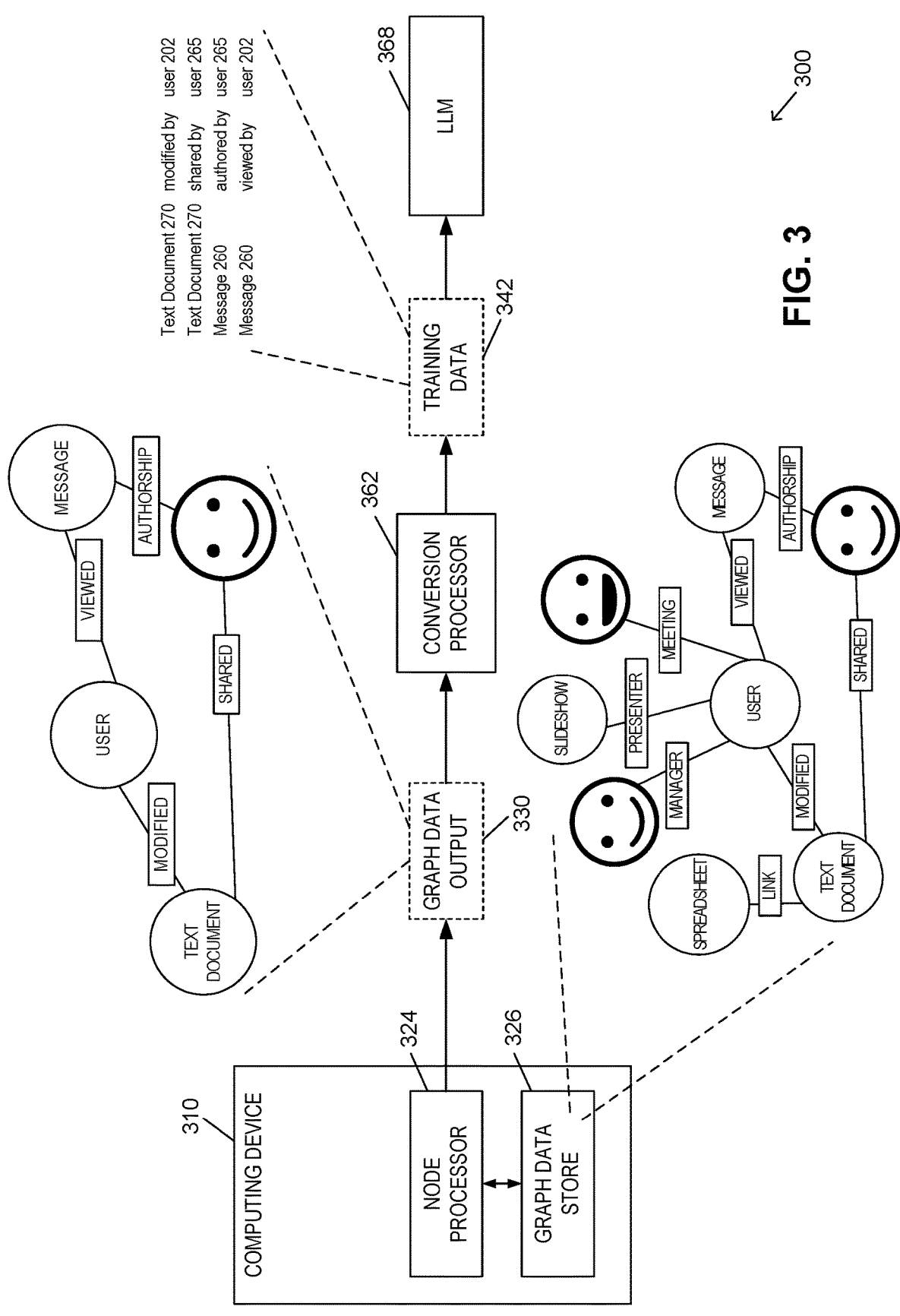
FIG. 3 shows an example block diagram for training a neural network model using graph data, according to an example embodiment.

FIG. 3 shows an example block diagram 300 for training a neural network model using graph data, according to an example embodiment. The block diagram 300 may be performed by a computing device 310 (corresponding to graph data source 110, graph data processor 120, or data store 160), a conversion processor 340 (corresponding to conversion processor 163), and an LLM 350 (corresponding to LLM 168). The computing device 310 comprises a graph data store 326 configured to store graph data, such as the data graph 200, and a node processor 324 (corresponding to node processor 112, 122, 162). In some examples, the graph data store 326 corresponds to the graph data store 114, the graph data store 124, and/or the unified data 164.

The node processor 324 is configured to receive a graph data query and, responsive to the graph data query, provide a suitable graph data output 330. As described above, an example of a graph data query may be "[sourceType; Document; Relation; "Authored by"; targetEntity; Vipindeep; targetType; Contact]" in response to a request from a target user of "How many documents were authored by Vipindeep?" In some examples, the graph data output 330 may take the form of a suitable data structure that is not readily understood by the LLM 368. The conversion processor 362 is configured to process the graph data output 330 to generate training data 342 in a text data format that is readable by the LLM 368. For example, a graph data query may correspond to a graph data output that comprises the nodes 202, 260, 265, and 270. To provide data in a suitable format for the LLM 368, the conversion processor 362 may convert the data structures for the nodes 202, 260, 265, and 270 into training data 342 with the following text data format:

| Text Document 270 | modified by | user 202 |
| Text Document 270 | shared by | user 265 |
| Message 260 | authored by | user 265 |
| Message 260 | viewed by | user 202 |

Although only simple relationships are shown in the text data format for clarity, complex relationships (e.g., one to many, many to one, many to many) and/or multiple relationships may also be represented using a suitable text data format, such as enclosing lists in brackets, using comma delimited lists, multiple line items, etc. In some examples, the training data 342 is spread out across multiple, distinct prompts, for example, to reduce prompt size, increase training speed for a prompt, etc. Advantageously, once the LLM 368 is trained using different instances of training data 342, the LLM 368 may more easily process new entities that are created or modified after the training. Generally, the LLM 368 may be trained using several hundred or a few thousand instances of the training data 342 (e.g., by taking slices of the data graph 200). In other examples, additional or fewer instances may be used for training.

In some examples, the LLM 368 is retrained when new entity types, metadata, fields, or other features are added to the data graph 200.

Figure 4:
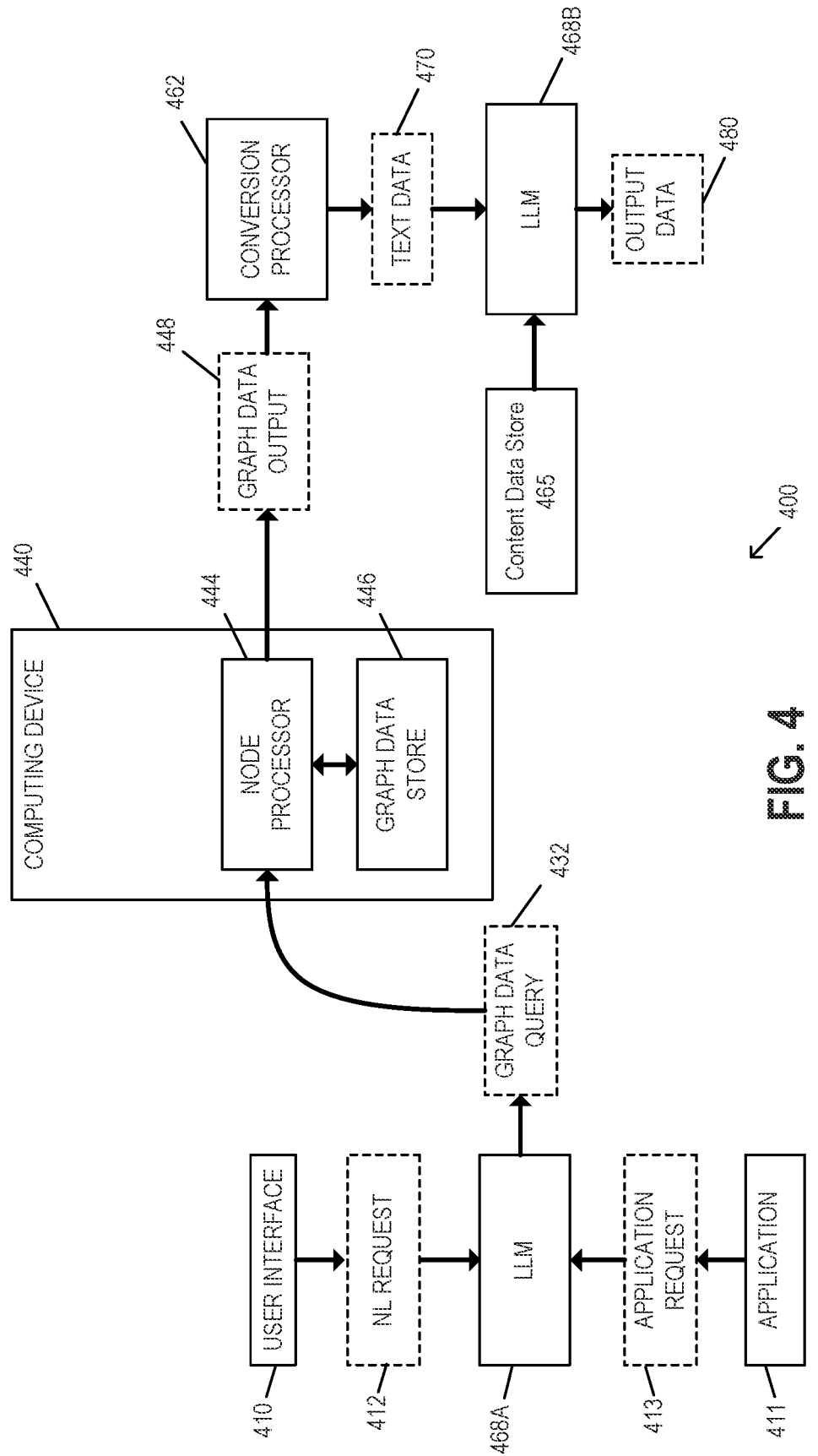
FIG. 4 shows an example block diagram for a system for generating output data based on a data graph, according to an example embodiment.

FIG. 4 shows an example block diagram for a system 400 for generating output data based on a data graph, according to an example embodiment. The system 400 comprises a user interface 410, a computing device 440 (generally corresponding to computing device 310), a conversion processor 462, and an LLM 468.

The user interface 410 may be implemented as a software module, application, smartphone app, web portal, or other suitable user interface using the graph data source 110, the graph data processor 120, the data store 160, a smartphone, or suitable computing device. Generally, the user interface 410 provides a text-based interface or chat interface to a target user. The target user may type in or speak (using a suitable voice to text converter, not shown) a natural language (NL) request 412. As an example, the target user may ask or provide a prompt of "Please help me prepare for my next meeting with Vipin" as the NL request 412. Advantageously, the NL request 412 allows for free form requests to be provided by a user, without requiring direct knowledge of the structure of an underlying data graph (e.g., data graph 200) or an API for accessing the data graph.

In some examples, the system 400 further comprises an application 411, such as a user application (e.g., a document processing application such as Microsoft Word, an email client such as Microsoft Outlook, etc.), server-based application (e.g., Microsoft Exchange), or other suitable application. The application 411 provides an application request 413 to the LLM 468, where the application request 413 generally corresponds to the NL request 412, but is instead generated by the application 411. The application request 413 may correspond to a user context for the target user, or a task at hand for the target user, such as an upcoming meeting to prepare for, an upcoming task to be completed, as a follow-up notice after a meeting (e.g., a to-do list), or other suitable scenario. In some examples, the user interface 410 is omitted and only the application 411 is used to generate the output request.

The LLM 468 (shown at 468A as a first instance of invoking the LLM 468) generates a graph data query 432 using an output request (i.e., one of the NL request 412 or the application request 413) as a first input. In accordance with the extraction prompt described above, the graph data query 432 is generated by the LLM 468 based on the graph schema (e.g., the data structure of the data graph 200). The graph data query 432 is performed against the data graph 200 to obtain a graph data output 448 that represents a sub-portion of the data graph 200. For example, the graph data query 432 is provided to a node processor 444 of the computing device 440, which identifies relevant nodes corresponding to the output request. As one example, the graph data output 448 may comprise a node a next meeting of the target user where Vipin is invited, nodes for users expected to attend the meeting, a node for recent documents discussed at a previous meeting, etc. Advantageously, the graph data output 448 may be tailored to a particular user by taking a slice or sub-graph around the target user. In this way, the graph data output 448 provides relevant context for a user, for example, based on their current schedule, recently used files, recent phone calls with contacts, etc.

The conversion processor 462 is configured to convert the graph data output 448 to a text data format (text data 470) that is readable by the LLM 468. As an example, the graph data output 448 may be converted into a text data format:

| Meeting-AAA | Created by | Vipin |
| Meeting-AAA | Attendee | Target User |
| Meeting-AAA | Contains | Agenda-April-2023.pptx |
| Email-BBB | Sent by | Target User |
| Email-BBB | Recipient | Vipin |
| Email-BBB | Contains | Agenda-2023.pptx, Agenda-2022.pptx |
| Agenda-2023.pptx | Document | |
| Agenda-2022.pptx | Document | |

As another example, a text data format for the Meeting-AAA may be converted to:

Meeting-AAA; [Created by; Attendee; Contains]; [Vipin, Target User, Agenda-April-2023.ptx]

The text data 470 is provided to the LLM 468 (shown at 468B as a second instance of invoking the LLM 468), which generates output data 480 based on the text data 470. In some examples, the LLM 468 also receives entities from a content data store 465 (corresponding to content data store 165) with the text data 470 (or as part of a follow-up request by the LLM 468) to generate the output data 480. For example, the LLM 468B may generate a summary of changes to the agenda for the meeting, tasks that have been completed based on a comparison of the Agenda-2023.pptx and the Agenda-2022.pptx, etc. Advantageously, instead of simply providing a summary of an individual document from the content data store 465, the LLM 468B receives graph data (text data 470) that is specific to a particular user and that user's context, which is used by the LLM 468B (after training, described above) to provide a summary that is tailored for a particular target user. For example, the LLM may generate different summaries of a document or email for particular users that place more emphasis on technical features when the target user is a software developer, or more emphasis on financial details when the target user is a project manager. Advantageously, the prioritization may be based on data within the data graph, without explicit requests by the target user for their own prioritization.

Figure 5:
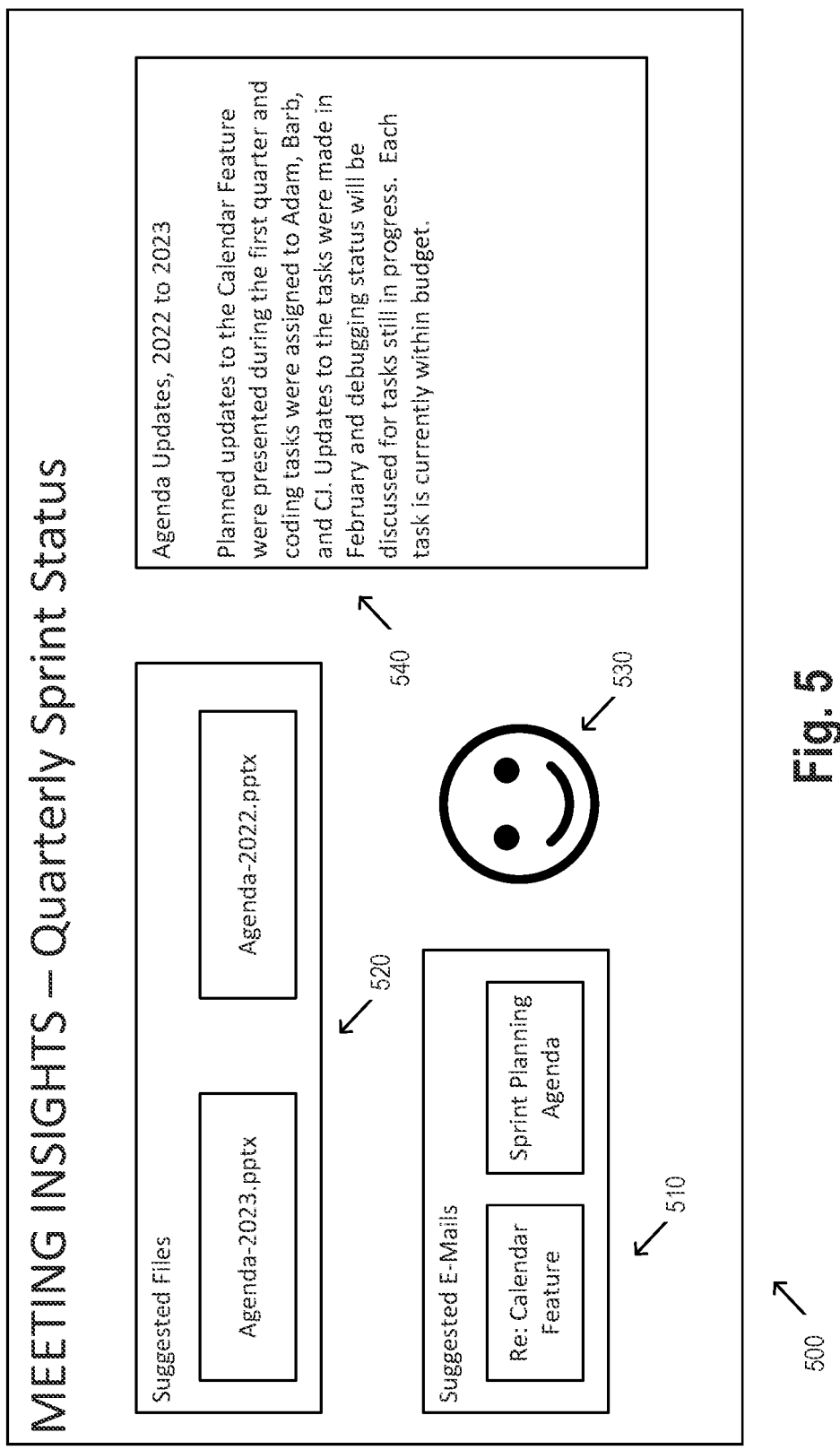
FIG. 5 shows a diagram of an example of a graphical user interface for providing output data from an LLM using graph data, according to an example embodiment.

FIG. 5 depicts an example of a graphical user interface 500 for providing output data from an LLM using graph data, according to an embodiment. Generally, the node processor 112 (or node processor 122, 162, 444) may be configured to identify nodes that are similar, related, or adjacent to a given node or to a search query. In some examples, the node processor 112 identifies the nodes based on a graph data query generated by the LLM, as described above. The graph data query may be generated in response to an NL request from a user or automatically based on a suitable trigger (e.g., opening a user interface menu item, receiving an email, saving a document) such as the application request 413, in various examples.

In the example shown in FIG. 5, the graphical user interface 500 includes a meeting insights "tile" or pop-up for an email node corresponding to an emailed invite to a quarterly sprint status meeting. The graphical user interface 500 may include suggested e-mails 510, suggested files 520, and/or suggested users 530, for example, corresponding to the graph data output 448 and/or text data 470. The graphical user interface 500 also comprises a summary 540. In one example, the summary 540 corresponds to the output data 480 and includes a summary of the documents Agenda-2023.pptx and Agenda-2022.pptx generated by the LLM 468. As described above, the summary 540 may be tailored to a particular user. In the example shown in FIG. 5, the summary 540 is generated by the LLM to focus more on software-related features (e.g., as might be relevant for a software developer) with only a small mention of budget at the end. In contrast, an alternate instance of the summary 540 for a project manager may provide further details on the budget, such as a remaining budget available, line items waiting to be approved before the meeting, etc.

FIG. 6 shows a flowchart of an example method 600 of training a large language model, according to an example embodiment. Technical processes shown in these figures will be performed automatically unless otherwise indicated. In any given example, some steps of a process may be repeated, perhaps with different parameters or data to operate on. Steps in an example may also be performed in a different order than the top-to-bottom order that is laid out in FIG. 6. Steps may be performed serially, in a partially overlapping manner, or fully in parallel. Thus, the order in which steps of method 600 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. At least some steps of FIG. 6 may be performed by the graph data source 110 (e.g., via the node processor 112), the graph data processor 120 (via the node processor 122, conversion processor 163, the language model 168), the data store 160 (via the node processor 162, the neural network model 166), or other suitable computing device.

Method 600 begins with step 602. At step 602, training graph data outputs from a data graph are converted into a text data format that is readable by the LLM. In some examples, the data graph corresponds to the data graph 200 and the LLM corresponds to the LLM 368. The training graph data outputs generally correspond to the graph data outputs 330 and may be converted by the conversion processor 362 into the training data 342. The data graph has nodes and edges between the nodes, for example, as shown in FIG. 2 and described above. The nodes represent entities associated with an enterprise organization and the edges representing relationships among the entities.

At step 604, a training set that comprises the converted training graph data outputs is generated. The training set generally corresponds to the training data 342 and may comprise a plurality of converted graph data outputs 330 based on the graph data store 326, for example.

At step 606, the LLM is trained to receive graph data as an input prompt using the training set.

At step 608, an extraction prompt is provided to the LLM. The extraction prompt comprises syntax examples for the LLM to extract second graph data outputs from the data graph.

The method 600 may further comprise providing a prioritization prompt to the LLM, the prioritization prompt comprising syntax examples for the LLM to extract weights for nodes of the data graph based on edges of the nodes. For example, the LLM may extract a ranking or other prioritization for the nodes (e.g., with higher priority for more recent access, files sent to a manager instead of to an external contact, etc.).

For example, the syntax examples describe graph walks of the data graph from a starting node, the graph walks identifying adjacent nodes from the starting node relative to a search query. The graph walk may be based on embeddings of the adjacent nodes and the weights for nodes correspond to a distance metric of the embeddings.

In some examples, the data graph is a heterogenous graph having nodes with different types, the entities include one or more of users, documents, emails, meetings, and conversations, and the relationships include one or more of document authorship, document modification, document sharing, meeting invites, linked data between documents, email sending, and email replying.

The method 600 may further comprise extracting the first graph data outputs from the data graph to comprise one or more of a first output according to a first sub-graph of the data graph with a user-level granularity, a second output according to a second sub-graph of the data graph with a group-level granularity, a third output according to a third sub-graph of the data graph with an enterprise-level granularity, and a fourth output according to a fourth sub-graph of the data graph with a document-level granularity.

The method 600 may further comprise: receiving a natural language request from a target user for output data based on the data graph; generating a graph data query with the LLM using the natural language request as a first input to the LLM, the graph data query being generated by the LLM based on a graph schema of the data graph and the extraction prompt; performing the graph data query against the data graph to obtain a graph data output that represents a sub-portion of the data graph based on the natural language request; and generating the output data with the LLM using the graph data output as a second input to the LLM.

FIG. 7 shows a flowchart of an example method 700 for generating output data based on a data graph, according to an example embodiment. Technical processes shown in these figures will be performed automatically unless otherwise indicated. In any given example, some steps of a process may be repeated, perhaps with different parameters or data to operate on. Steps in an example may also be performed in a different order than the top-to-bottom order that is laid out in FIG. 7. Steps may be performed serially, in a partially overlapping manner, or fully in parallel. Thus, the order in which steps of method 700 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. At least some steps of FIG. 7 may be performed by the graph data source 110 (e.g., via the node processor 112), the graph data processor 120 (via the node processor 122, conversion processor 163, the language model 168), the data store 160 (via the node processor 162, the neural network model 166), or other suitable computing device.

Method 700 begins with step 702. At step 702, an output request for the output data based on the data graph is received. The output request comprises one of a natural language request from a target user or an application request from an application of the target user. The data graph has nodes and edges between the nodes, where the nodes represent entities associated with an enterprise organization and the edges representing relationships among the entities. The output request may correspond to the NL request 412 (or application request 413) and the data graph may correspond to the data graph 200, for example. The graph data output represents one or more nodes from the data graph. The data graph is a heterogenous graph having nodes with different types, where the entities include one or more of users, documents, emails, meetings, and conversations, and the relationships include one or more of document authorship, document modification, document sharing, meeting invites, linked data between documents, email sending, and email replying. In some examples, the output request comprises a request for nodes of the data graph that are related to the graph data query and generating the graph data query with the LLM comprises providing an extraction prompt to the LLM, the extraction prompt comprising syntax examples for the LLM to extract graph data outputs from the data graph.

At step 704, a graph data query is generated with a large language model (LLM) using the output request as a first input to the LLM. In some examples, the graph data query is based on the graph schema and may correspond to the graph data query 432 for the LLM 468, for example.

At step 706, the graph data query is performed against the data graph to obtain a graph data output that represents a sub-portion of the data graph. For example, the node processor 444 may perform the graph data query 432 using the graph data store 446.

At step 708, the output data is generated with the LLM using the graph data output as a second input to the LLM. For example, the output data 480 may be generated by the LLM 468. In some examples, step 708 comprises converting the graph data output to a text data format that is readable by the LLM. For example, the conversion processor 462 may convert the graph data output 448 into the text data 470).

Generally, step 708 may further comprise providing the converted graph data output, as the second input, with one or more documents corresponding to the one or more nodes as a third input, to the LLM to generate the output data. For example, the LLM 468B may receive documents from the content data store 465 along with the text data 470.

In some examples, the converted graph data output represents weights for the one or more documents according to the target user and step 708 comprises generating a weighted summary of content of the one or more documents according to the weights. The weights for the one or more documents may comprise respective numbers of LLM tokens to be used for generating the weighted summary by the LLM. For example, the LLM may have a limit of 1500 tokens for a generative output and the weighted summary may be allocated with 400 tokens for a first document, 800 tokens for a second document, and 300 tokens for a third document.

In some examples, the graph data output represents a plurality of nodes from the data graph, the plurality of nodes comprises the one or more nodes, and the converted graph data output represents a user context for the target user. In one such example, step 708 further comprises selecting the one or more nodes as a subset of the plurality of nodes for the output data according to the user context for the target user and generating a summary of content of the one or more documents, the converted graph data output representing weights for the one or more documents according to the target user.

Figure 8:
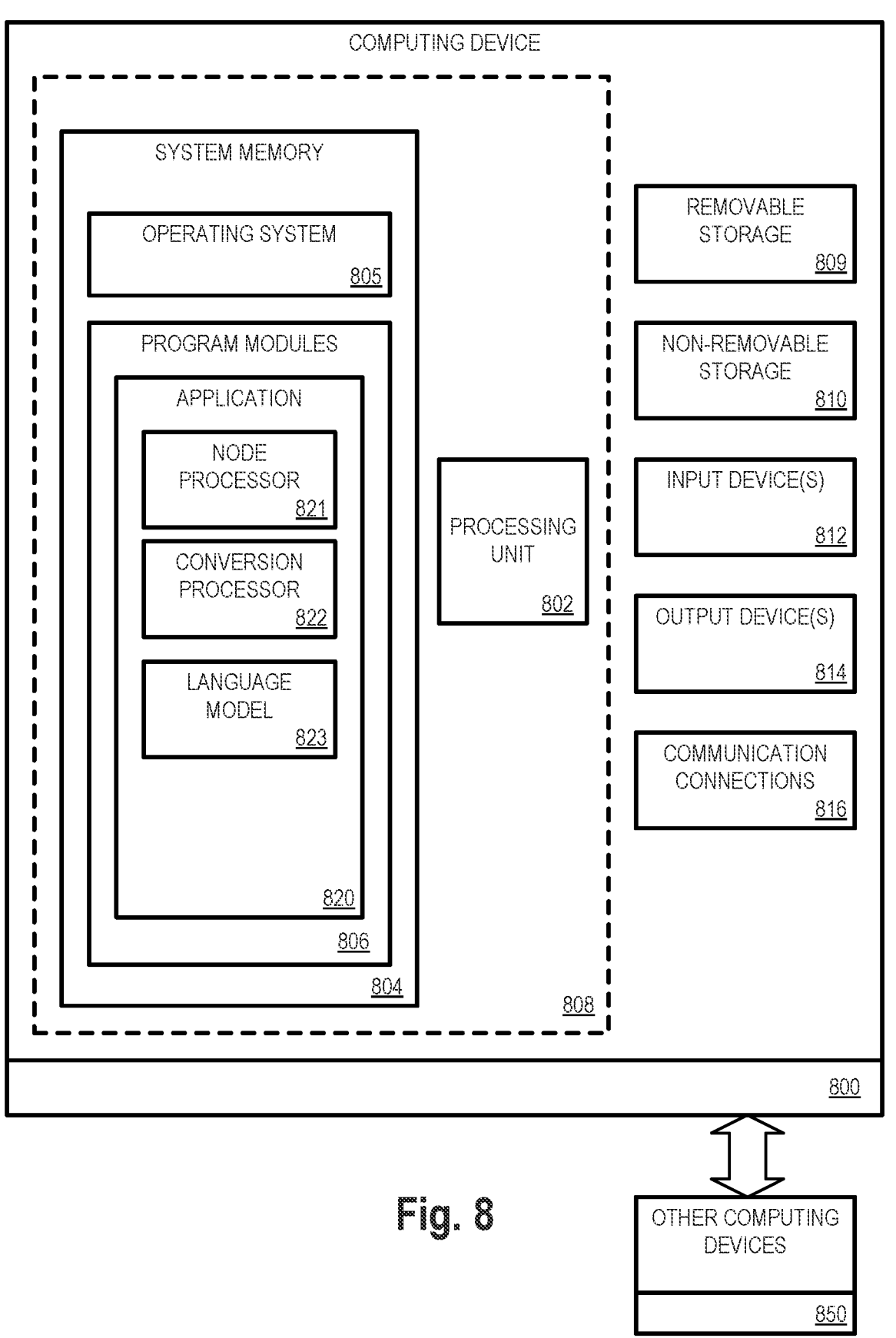
FIG. 8 is a block diagram illustrating example physical components of a computing device with which aspects of the disclosure may be practiced.
Figure 9:
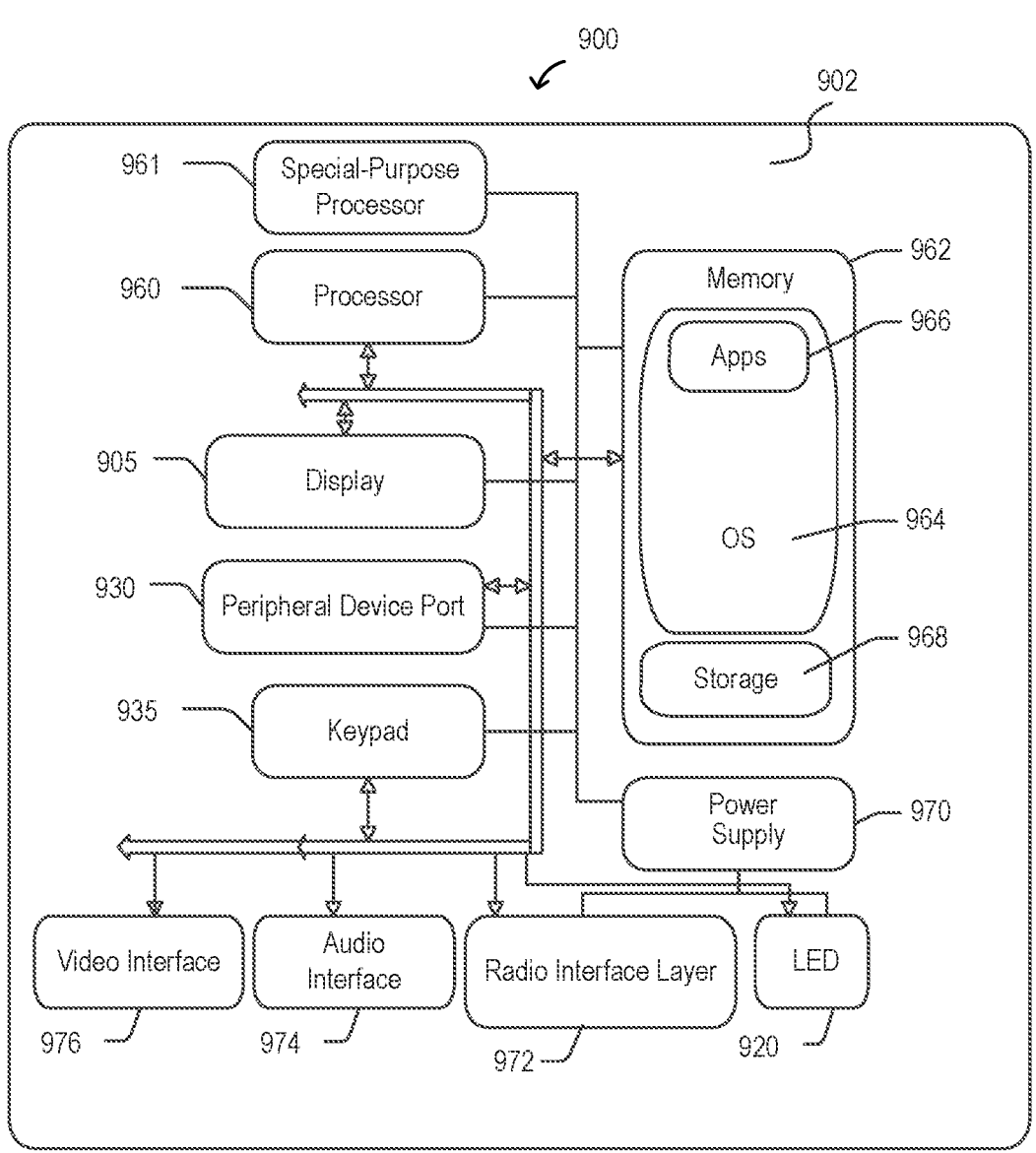
FIG. 9 is a simplified block diagram of a computing device with which aspects of the present disclosure may be practiced.

FIGS. 8 and 9 and the associated descriptions provide a discussion of a variety of operating environments in which aspects of the disclosure may be practiced. However, the devices and systems illustrated and discussed with respect to FIGS. 8 and 9 are for purposes of example and illustration and are not limiting of a vast number of computing device configurations that may be utilized for practicing aspects of the disclosure, as described herein.

FIG. 8 is a block diagram illustrating physical components (e.g., hardware) of a computing device 800 with which aspects of the disclosure may be practiced. The computing device components described below may have computer executable instructions for implementing a node processor application 820 on a computing device (e.g., graph data source 110), including computer executable instructions for node processor application 820 that can be executed to implement the methods disclosed herein. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for running node processor application 820, such as one or more components with regard to FIG. 1 or FIG. 5, and, in particular, node processor 821 (e.g., corresponding to node processor 112, 122, 514, or 524).

The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., node processor application 820) may perform processes including, but not limited to, the aspects, as described herein. Other program modules that may be used in accordance with aspects of the present disclosure, and in particular for generating a unified graph, may include node processor 821.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 9 is a block diagram illustrating the architecture of one aspect of a computing device 900. That is, the computing device 900 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone. The system 902 may include a display 905 (analogous to display 905), such as a touch-screen display or other suitable user interface. The system 902 may also include an optional keypad 935 (analogous to keypad 935) and one or more peripheral device ports 930, such as input and/or output ports for audio, video, control signals, or other suitable signals.

The system 902 may include a processor 960 coupled to memory 962, in some examples. The system 902 may also include a special-purpose processor 961, such as a neural network processor. One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as email or other messages used by an email application, and the like. A synchronization application (not shown) also resides on the system 902 and is programmed to interact with a corresponding synchronization application resident on a host computer to keep the information stored in the non-volatile storage area 968 synchronized with corresponding information stored at the host computer.

The system 902 has a power supply 970, which may be implemented as one or more batteries. The power supply 970 may further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via an audio transducer (not shown). In the illustrated embodiment, the visual indicator 920 is a light emitting diode (LED) and the audio transducer may be a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer, the audio interface 974 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 976 that enables an operation of peripheral device port 930 (e.g., for an on-board camera) to record still images, video stream, and the like.

A computing device 900 implementing the system 902 may have additional features or functionality. For example, the computing device 900 may also include additional data storage devices (removable and/or non-removable) such as, magnetic disks, optical disks, or tape. Such additional storage is illustrated in FIG. 9 by the non-volatile storage area 968.

Data/information generated or captured by the system 902 may be stored locally, or the data may be stored on any number of storage media that may be accessed by the device via the radio interface layer 972 or via a wired connection between the computing device 900 and a separate computing device associated with the computing device 900, for example, a server computer in a distributed computing network, such as the Internet. As should be appreciated such data/information may be accessed via the computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

As should be appreciated, FIG. 9 is described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method of generating output data based on a data graph, the method comprising:

receiving an output request for the output data based on the data graph, the output request comprising one of a natural language request from a target user or an application request from an application of the target user, the data graph having nodes and edges between the nodes, the nodes representing entities associated with an enterprise organization, and the edges representing relationships among the entities;

generating a graph data query with a large language model (LLM) using the output request as a first input to the LLM;

performing the graph data query against the data graph to obtain a graph data output that represents a sub-portion of the data graph; and generating the output data with the LLM using the graph data output as a second input to the LLM.

2. The computer-implemented method of claim 1, wherein:

the graph data output represents one or more nodes from the data graph;

the data graph is a heterogenous graph having nodes with different types;

the entities include one or more of users, documents, emails, meetings, and conversations; and the relationships include one or more of document authorship, document modification, document sharing, meeting invites, linked data between documents, email sending, and email replying.

3. The computer-implemented method of claim 2, wherein generating the output data with the LLM comprises converting the graph data output to a text data format that is readable by the LLM.

4. The computer-implemented method of claim 3, wherein generating the output data with the LLM comprises providing the converted graph data output, as the second input, with one or more documents corresponding to the one or more nodes as a third input, to the LLM to generate the output data.

5. The computer-implemented method of claim 4, wherein the converted graph data output represents weights for the one or more documents according to the target user; and generating the output data comprises generating a weighted summary of content of the one or more documents according to the weights.

6. The computer-implemented method of claim 5, wherein the weights for the one or more documents comprise respective numbers of LLM tokens to be used for generating the weighted summary by the LLM.

7. The computer-implemented method of claim 4, wherein:

the graph data output represents a plurality of nodes from the data graph, the plurality of nodes comprises the one or more nodes, and the converted graph data output represents a user context for the target user;

generating the output data comprises selecting the one or more nodes as a subset of the plurality of nodes for the output data according to the user context for the target user; and wherein generating the output data comprises generating a summary of content of the one or more documents, the converted graph data output representing weights for the one or more documents according to the target user.

8. The computer-implemented method of claim 1, wherein:

the output request comprises a request for nodes of the data graph that are related to the graph data query; and generating the graph data query with the LLM comprises providing an extraction prompt to the LLM, the extraction prompt comprising syntax examples for the LLM to extract graph data outputs from the data graph.

9. A system for generating output data based on a data graph, the system comprising:

at least one processor, and at least one memory storing computer-executable instructions that when executed by the at least one processor cause the at least one processor to:

receive an output request for the output data based on the data graph, the output request comprising one of a natural language request from a target user or an application request from an application of the target user, the data graph having nodes and edges between the nodes, the nodes representing entities associated with an enterprise organization, and the edges representing relationships among the entities;

generate a graph data query with a large language model (LLM) using the output request as a first input to the LLM;

perform the graph data query against the data graph to obtain a graph data output that represents a sub-portion of the data graph; and generate the output data with the LLM using the graph data output as a second input to the LLM.

10. The system of claim 9, wherein:

the graph data output represents one or more nodes from the data graph;

the data graph is a heterogenous graph having nodes with different types;

the entities include one or more of users, documents, emails, meetings, and conversations; and the relationships include one or more of document authorship, document modification, document sharing, meeting invites, linked data between documents, email sending, and email replying.

11. The system of claim 10, wherein the computer-executable instructions cause the at least one processor to generate the output data with the LLM comprises converting the graph data output to a text data format that is readable by the LLM.

12. The system of claim 11, wherein the computer-executable instructions cause the at least one processor to provide the converted graph data output, as the second input, with one or more documents corresponding to the one or more nodes as a third input, to the LLM to generate the output data.

13. The system of claim 12, wherein the converted graph data output represents weights for the one or more documents according to the target user; and the computer-executable instructions cause the at least one processor to generate a weighted summary of content of the one or more documents according to the weights.

14. The computer-implemented method of claim 1, wherein the LLM is trained using a training set derived from a plurality of graph data outputs converted into a text format readable by the LLM, and providing the converted outputs as input to the LLM during training.

15. The computer-implemented method of claim 14, wherein the plurality of graph data outputs are generated from a training graph, the training graph comprising nodes representing entities associated with an enterprise organization and edges representing relationships among the entities.

16. The computer-implemented method of claim 14, further comprising providing an extraction prompt to the LLM, the extraction prompt comprising a syntax example for the LLM to extract a second graph data output from the data graph, and providing the second graph data output as the output data.

17. The system of claim 9, wherein the LLM is trained using a training set derived from a plurality of graph data outputs converted into a text format readable by the LLM, and providing the converted outputs as input to the LLM during training.

18. The system of claim 17, wherein the plurality of graph data outputs are generated from a training graph, the training graph comprising nodes representing entities associated with an enterprise organization and edges representing relationships among the entities.

19. The system of claim 17, further comprising providing an extraction prompt to the LLM, the extraction prompt comprising a syntax example for the LLM to extract a second graph data output from the data graph, and providing the second graph data output as the output data.

20. Non-transitory computer storage media having computer-readable instructions embodied thereon that, when executed by at least one processor, perform operations, the operations comprising:

receiving an output request for the output data based on the data graph, the output request comprising one of a natural language request from a target user or an application request from an application of the target user, the data graph having nodes and edges between the nodes, the nodes representing entities associated with an enterprise organization, and the edges representing relationships among the entities;

generating a graph data query with a large language model (LLM) using the output request as a first input to the LLM;

performing the graph data query against the data graph to obtain a graph data output that represents a sub-portion of the data graph;

generating the output data with the LLM using the graph data output as a second input to the LLM.

\* \* \* \* \*